United States Patent
Okuda

(10) Patent No.: US 6,442,273 B1
(45) Date of Patent: Aug. 27, 2002

(54) ECHO CANCELLER AND ECHO CANCELLING METHOD

(75) Inventor: Kozo Okuda, Hirakata (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 09/508,583

(22) PCT Filed: Sep. 10, 1998

(86) PCT No.: PCT/JP98/04106
§ 371 (c)(1),
(2), (4) Date: Mar. 14, 2000

(87) PCT Pub. No.: WO99/14867
PCT Pub. Date: Mar. 25, 1999

(30) Foreign Application Priority Data

Sep. 16, 1997 (JP) .............................. 9-250464

(51) Int. Cl.[7] .............................................. H04M 9/08
(52) U.S. Cl. ............................ 379/406.03; 379/406.01; 379/406.2; 379/406.04; 379/406.06; 379/406.08; 379/406.09
(58) Field of Search .................................. 379/400–416

(56) References Cited

U.S. PATENT DOCUMENTS

| | | | | |
|---|---|---|---|---|
| 5,479,502 A | * | 12/1995 | Ohga et al. | 379/389 |
| 5,535,194 A | * | 7/1996 | Ashley et al. | 370/32.1 |
| 5,631,900 A | * | 5/1997 | McCaslin et al. | 370/287 |
| 5,661,795 A | * | 8/1997 | Meada | 379/412 |
| 5,912,966 A | * | 6/1999 | Ho | 379/410 |

FOREIGN PATENT DOCUMENTS

| | | |
|---|---|---|
| JP | 64-34021 | 2/1989 |
| JP | 1-318325 | 12/1989 |
| JP | 4-286218 | 10/1992 |
| JP | 5-206896 | 8/1993 |
| JP | 6-14100 | 1/1994 |
| JP | 6-22025 | 1/1994 |
| JP | 8-288889 | 11/1996 |

OTHER PUBLICATIONS

International Preliminary Examination Report issued in PCT/JP98/04106 on Nov. 26, 1999, English–language translation (4 pages mailed May 12, 2000).

\* cited by examiner

Primary Examiner—Forester W. Isen
Assistant Examiner—Ramnandan Singh
(74) Attorney, Agent, or Firm—Smith, Gambrell & Russell, LLP

(57) ABSTRACT

An object of the present invention is to provide an echo canceller capable of generating, when the double-talk detection precision is degraded and the learning of a filter coefficient swings by noises, an echo replica signal using a filter coefficient having a low degree of error at the time of detecting a double-talk state. A backup filter coefficient is calculated by adding a predetermined weighting factor times a filter coefficient obtained by the learning and a predetermined weighting factor times the preceding backup filter coefficient stored in second storage means.

6 Claims, 4 Drawing Sheets

ECHO CANCELLER AND ECHO CANCELLING METHOD

TECHNICAL FIELD

The present invention relates to an echo canceller and an echo canceling method.

BACKGROUND ART

Conventionally, an echo canceller for estimating an echo flowing through a speech path and subtracting the echo from an echo signal fed to the speech path to cancel the echo has been known. The echo is estimated by learning a filter coefficient of a filter for generating an echo replica signal (a pseudo echo signal) In such an echo canceller, an accurate filter coefficient cannot be learned at the time of a double-talk (two-way simultaneous speech communication). Accordingly, the learning of the filter coefficient is stopped at the time of the double-talk.

In such an echo canceller, however, there is a time lag from the time when a double-talk state actually occurs to the time when the double-talk state is detected, and the filter coefficient is learned during the time lag. In such a period, therefore, an accurate filter coefficient cannot be obtained.

When the learning of the filter coefficient is stopped in a case where the double-talk state occurs, the learning of the filter coefficient must be started from the beginning when the double-talk state is released. Accordingly, the convergence of the learning is delayed.

An echo canceller for alternately storing a filter coefficient obtained by learning in two memories, stopping the learning and using a filter coefficient in a memory different from a memory storing a filter coefficient currently used to generate an echo replica signal has been developed when a double-talk state is detected (see JP-A8-265222).

When the double-talk detection precision is degraded, however, a filter coefficient having a high degree of error at the time of detecting the double-talk state may be also used in the above-mentioned method.

An object of the present invention is to provide an echo canceller and an echo canceling method capable of generating an echo replica signal using a filter coefficient having a low degree of error at the time of detecting a double-talk state in a case where the double-talk detection precision is degraded and a case where the learning of the filter coefficient swings by noises.

BRIEF SUMMARY OF THE INVENTION

A first echo canceller according to the present invention is characterized by comprising means for storing in first storage means the newest filter coefficient obtained by learning means for learning a filter coefficient for producing an echo replica by an adaptive filter; means for calculating, every time the learning is performed for a predetermined time period by the learning means, a backup filter coefficient on the basis of the newest filter coefficient obtained by the learning and storing the obtained backup filter coefficient in second storage means; first echo cancellation means for producing an echo replica on the basis of the filter coefficient stored in the first storage means and canceling an echo on the basis of the produced echo replica; second echo cancellation means for producing an echo replica on the basis of the filter coefficient stored in the second storage means and canceling an echo on the basis of the produced echo replica; means for detecting a double-talk state; means for selecting and outputting an output signal obtained by the first echo cancellation means when the double-talk state is not detected; and means for stopping the learning by the learning means, storing in the first storage means the filter coefficient stored in the second storage means, and selecting and outputting an output signal obtained by the second echo cancellation means when the double-talk state is detected, and in that the backup filter coefficient is calculated by adding a predetermined weighting factor times the filter coefficient obtained by the learning and a predetermined weighting factor times the preceding backup filter coefficient stored in the second storage means.

A second echo canceller according to the present invention is characterized by comprising means for storing in first storage means the newest filter coefficient obtained by learning means for learning a filter coefficient for producing an echo replica by an adaptive filter; means for calculating, every time the learning is performed for a predetermined time period by the learning means, a backup filter coefficient on the basis of the newest filter coefficient obtained by the learning and storing the obtained backup filter coefficient in second storage means; first echo cancellation means for producing an echo replica on the basis of the filter coefficient stored in the first storage means and canceling an echo on the basis of the produced echo replica; second echo cancellation means for producing an echo replica on the basis of the filter coefficient stored in the second storage means and canceling an echo on the basis of the produced echo replica; means for detecting a state where there is a possibility of a double-talk; means for detecting a double-talk state when the state where there is a possibility of a double-talk is continued for a predetermined time period; means for selecting and outputting an output signal obtained by the first echo cancellation means when the double-talk state is not detected; means for selecting and outputting an output signal obtained by the second echo cancellation means when the state where there is a possibility of a double-talk is detected; and means for stopping the learning by the learning means, storing in the first storage means the filter coefficient stored in the second storage means, and selecting and outputting an output signal obtained by the second echo cancellation means when the double-talk state is detected.

It is preferable that the backup filter coefficient is calculated by adding a predetermined weighting factor times the filter coefficient obtained by the learning and a predetermined weighting factor times the preceding backup filter coefficient stored in the second storage means.

A first echo canceling method according to the present invention is characterized by comprising the steps of storing in first storage means the newest filter coefficient obtained by learning means for learning a filter coefficient for producing an echo replica by an adaptive filter; calculating, every time the learning is performed for a predetermined time period by the learning means, a backup filter coefficient on the basis of the newest filter coefficient obtained by the learning and storing the obtained backup filter coefficient in second storage means; detecting a double-talk state; producing an echo replica on the basis of the filter coefficient stored in the first storage means and canceling an echo on the basis of the produced echo replica when the double-talk state is not detected; and stopping the learning by the learning means, storing in the first storage means the filter coefficient stored in the second storage means, producing an echo replica on the basis of the filter coefficient stored in the second storage means, and canceling an echo on the basis of the produced echo replica when the double-talk state is detected, and is characterized in that the backup filter coefficient is calculated by adding a predetermined weighting factor times the filter coefficient obtained by the learning and a predetermined weighting factor times the preceding backup filter coefficient stored in the second storage means.

A second echo canceling method according to the present invention is characterized by comprising the steps of storing in first storage means the newest filter coefficient obtained by learning means for learning a filter coefficient for producing an echo replica by an adaptive filter; calculating, every time the learning is performed for a predetermined time period by the learning means, a backup filter coefficient on the basis of the newest filter coefficient obtained by the learning and storing the obtained backup filter coefficient in second storage means; detecting a state where there is a possibility of a double-talk; detecting a double-talk state when the state where there is a possibility of a double-talk is continued for a predetermined time period; producing an echo replica on the basis of the filter coefficient stored in the first storage means and canceling an echo on the basis of the produced echo replica when the state where there is a possibility of a double-talk and the double-talk state are not detected; producing an echo replica on the basis of the filter coefficient stored in the second storage means and canceling an echo on the basis of the produced echo replica when the state where there is a possibility of a double-talk is detected; and stopping the learning by the learning means, storing in the first storage means the filter coefficient stored in the second storage means, and producing an echo replica on the basis of the filter coefficient stored in the second storage means, and canceling an echo on the basis of the produced echo replica when the double-talk state is detected.

It is preferable that the backup filter coefficient is calculated by adding a predetermined weighting factor times the filter coefficient obtained by the learning and a predetermined weighting factor times the preceding backup filter coefficient stored in the second storage means.

The learning means for learning the filter coefficient of the adaptive filter includes algorithms, for example, NLMS (Normalized Least Mean Square), APA (Affine Projection Algorithm), and RLS (Recursive Least Square), as also described in THE JOURNAL OF THE ACOUSTICAL SOCIETY OF JAPAN, VOL. 48, NO. 7, 1992 "Outline of Adaptive Filter". Any one of the algorithms may be used.

According to the present invention, it is possible to generate an echo replica signal using a filter coefficient having a low degree of error at the time of detecting a double-talk state in a case where the double-talk detection precision is degraded and a case where the learning of a filter coefficient swings by noises.

BEST MODE FOR CARRYING OUT THE INVENTION

Figure 1:
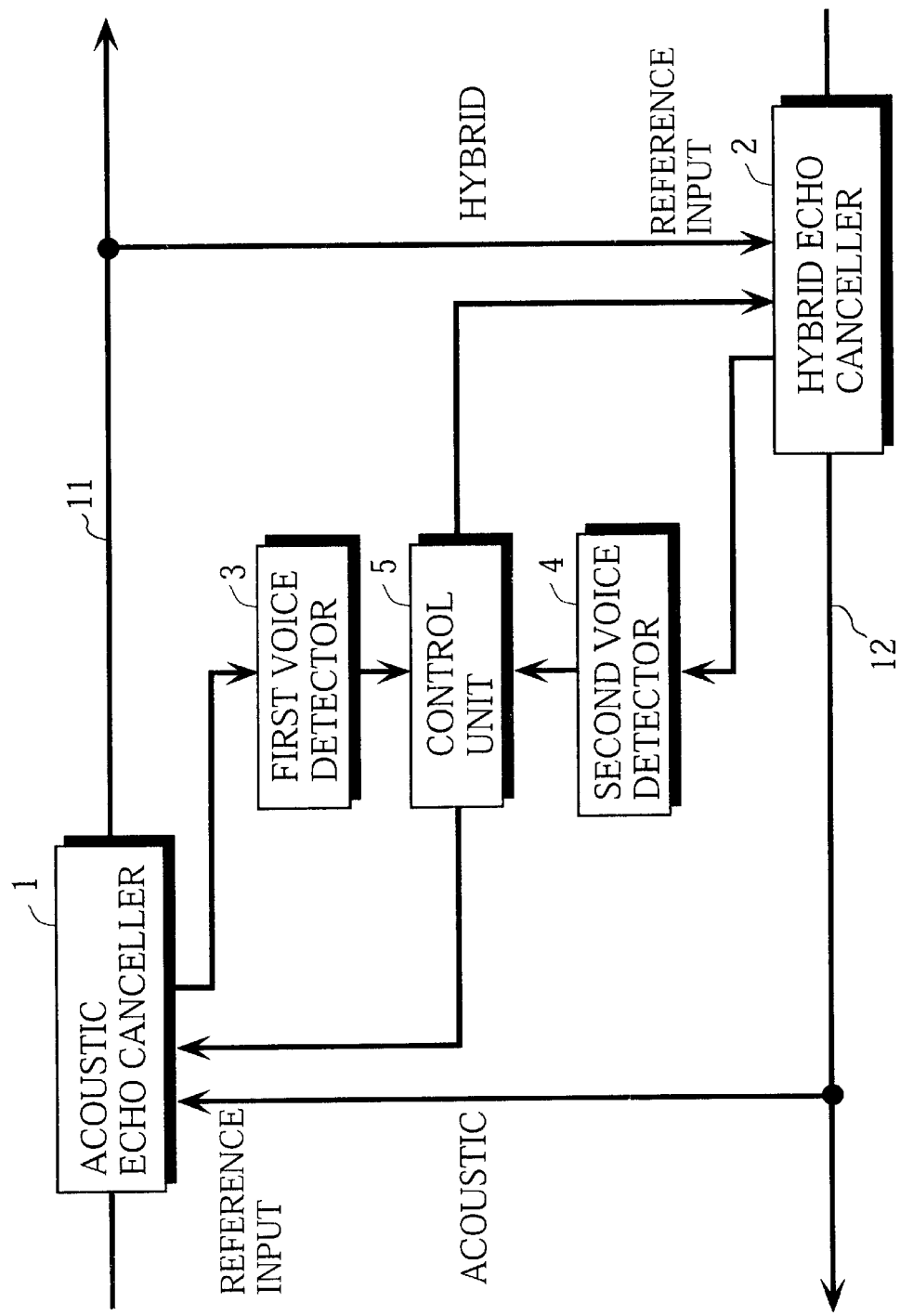
FIG. 1 is a block diagram showing the entire configuration of an echo canceller block.

Referring now to the drawings, an embodiment of the present invention will be described.

FIG. 1 illustrates the entire configuration of an echo canceller block.

The echo canceller block comprises an acoustic echo canceller 1 provided in a transmission path 11, a hybrid echo canceller 2 provided in a receiving path 12, a first voice detector 3 for detecting a voice signal in the transmission path 11, a second voice detector 4 for detecting a voice signal in the receiving path 12, and a control unit 5 for controlling both the echo cancellers 1 and 2.

The acoustic echo canceller 1 is for removing an echo signal flowing through the transmission path 11, and the hybrid echo canceller 2 is for removing an echo signal flowing through the receiving path 12. The control unit 5 judges a speech communication state such as a single-talk state or a double-talk state on the basis of detection signals of the first voice detector 3 and the second voice detector 4. Both the echo cancellers 1 and 2 are controlled in response to the results of the judgment.

Figure 2:
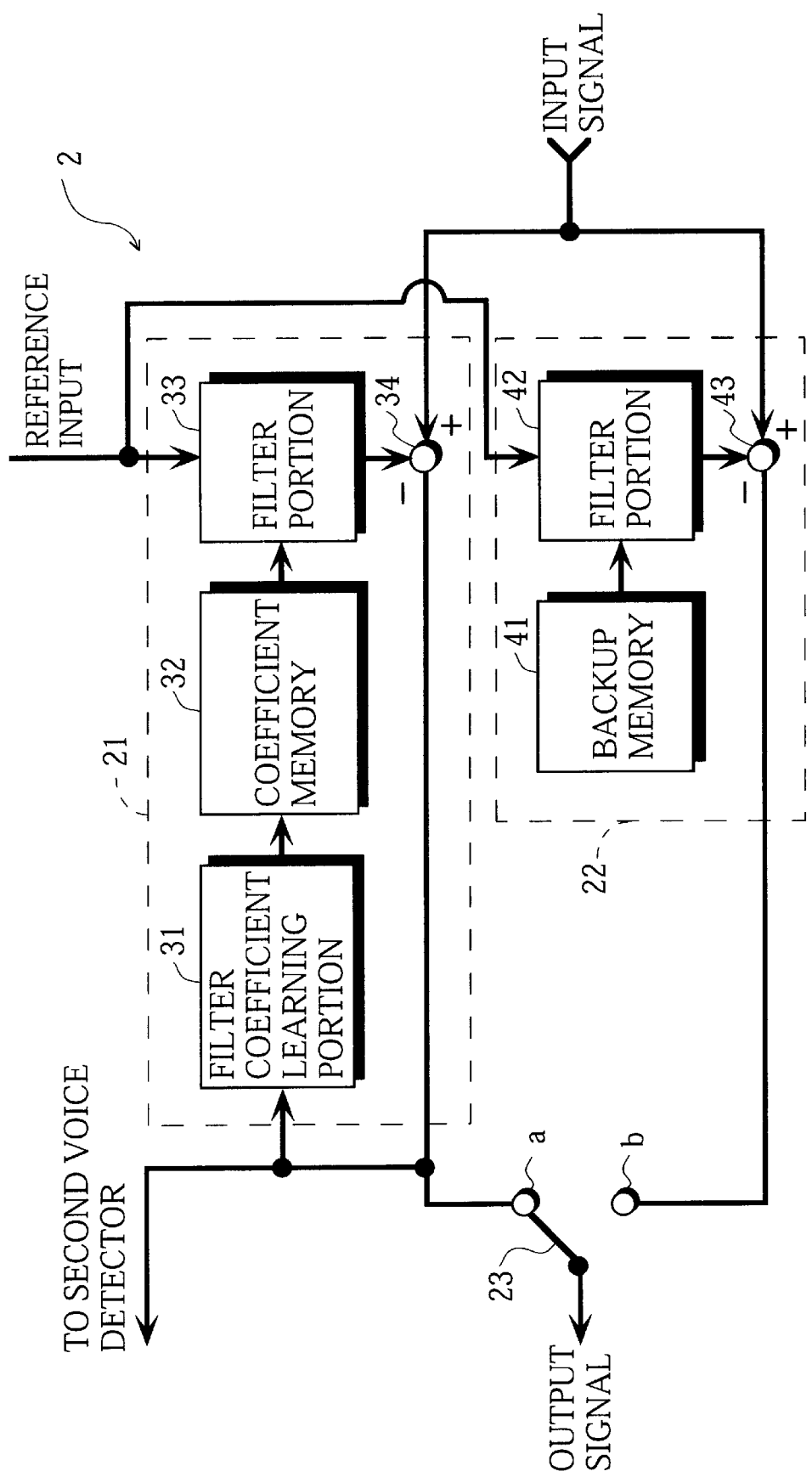
FIG. 2 is a block diagram showing the configuration of a hybrid (line) echo canceller 2.

FIG. 2 illustrates the configuration of the hybrid echo canceller 2.

The hybrid echo canceller 2 comprises a first echo canceller (first echo cancellation means) 21, a second echo canceller (second echo cancellation means) 22, and a switch 23.

The first echo canceller 21 comprises a filter coefficient learning portion 31 for learning a filter coefficient, a coefficient memory 32 storing the newest filter coefficient obtained by the filter coefficient learning portion 31, a filter portion 33 for taking a signal from the transmission path 11 as a reference input to generate a first echo replica signal in response to the filter coefficient stored in the coefficient memory 32, and a subtracter 34 for subtracting the first echo replica signal from an input signal fed to the receiving path 12. The filter coefficient learning portion 31 learns the coefficient such that a cancellation error outputted from the subtracter 34 becomes zero.

The second echo canceller 22 comprises a backup memory 41 storing a backup coefficient calculated on the basis of the newest filter coefficient every time the learning is performed for a predetermined time period by the filter coefficient learning portion 31, a filter portion 42 for taking a signal from the transmission path 11 as a reference input to generate a second echo replica signal in response to the backup coefficient stored in the backup memory 41, and a subtracter 43 for subtracting the second echo replica signal from the input signal fed to the receiving path 12.

An output of the subtracter 34 is fed to a contact a of a switch 23. An output of the subtracter 43 is fed to a contact b of the switch 23.

Letting $B_N$ be a backup coefficient currently stored in the backup memory 41, $B_{(N-1)}$ be the preceding backup coefficient stored in the backup memory 41, and $F_N$ be a filter coefficient most newly obtained by the learning in the filter coefficient learning portion 31 in the first echo canceller 21 the backup coefficient $B_N$ is calculated on the basis of the following equation (1).

$$B_N = (B_{(N-1)} \times W) + (F_N \times W) \tag{1}$$

In the foregoing equation (1), W1 and W2 are previously set weighting factors, and the sum (W1+W2) is 1.0.

The configuration of the acoustic echo canceller 1 is the same as that of the hybrid echo canceller 2 and hence, the description thereof is omitted.

Figure 3:
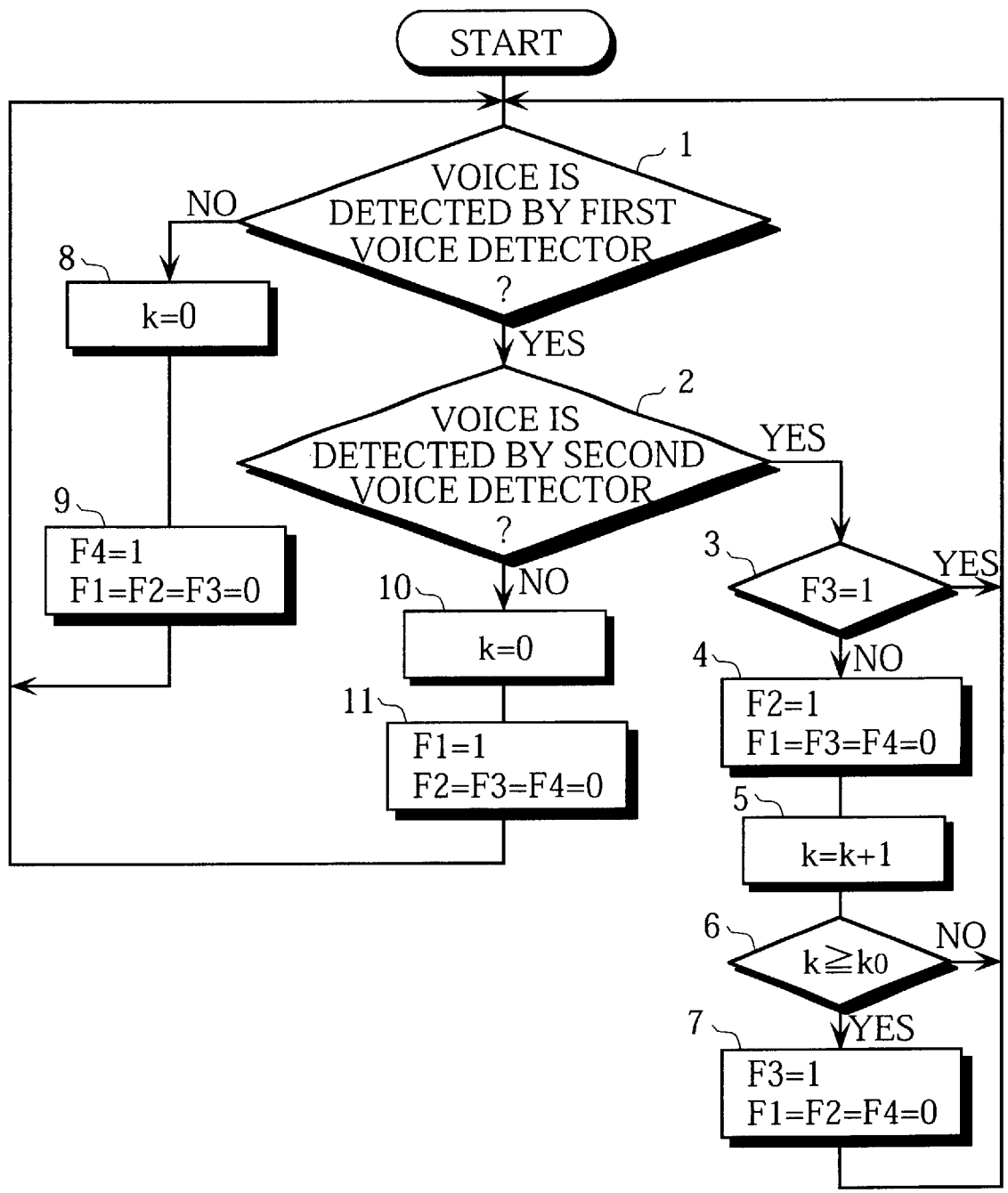
FIG. 3 is a flow chart showing the procedure for state judgment processing by a control unit.

FIG. 3 shows the procedure for state judgment processing for controlling the hybrid echo canceller 2 by the control unit 5.

In the state judgment processing, four types of flags F1 to F4 are controlled. The first flag F1 is a flag for remembering that the speech communication state is a state where a talk is made only from the acoustic side to the hybrid side (a first single-talk state). The second flag F2 is a flag for remembering that the speech communication state is a state where there is a possibility of a double-talk, that is, a double-talk state or an l-unclear state where it is unclear whether the double-talk state occurs or an echo path is merely changed. The third flag F3 is a flag for remembering that the speech communication state is a double-talk state. The fourth flag F4 is a flag for remembering that the speech communication state is a state where a talk is made only from the hybrid side to the acoustic side (a second single-talk state)

In a case where the second single-talk state occurs, a filter coefficient cannot be learned in the hybrid echo canceller 2 because no echo is produced in the receiving path 12. When the hybrid echo canceller 2 is controlled, therefore, the fourth flag F4 is a flag for remembering that the speech communication state is a state where learning is impossible.

In a case where the first single-talk state occurs, a filter coefficient cannot be learned in the acoustic echo canceller 1 because no echo is produced in the transmission path 11. When the acoustic echo canceller 1 is controlled, therefore, the first flag F1 is a flag for remembering that the speech communication state is a state where learning is impossible.

In the state judgment processing, it is judged whether or not a voice is detected by the first voice detector 3 (step 1). When the voice is detected by the first voice detector 3, it is judged whether or not a voice is detected by the second voice detector 4 (step 2).

When the voice is detected by the first voice detector 3 and the voice is detected by the second voice detector 4, it is judged whether or not the third flag F3 indicating that the speech communication state is a double-talk state is set (F3=1) (step 3). When the third flag F3 is set (F3=1), the program is returned to the step 1.

When the third flag F3 is not set (F3=0), the second flag F2 indicating that the speech communication state is an unclear state (a state where there is a possibility of a double-talk) is set (F2=1), and the other flags F1, F3, and F4 are reset (F1=F3=F4=0) (step 4).

A count value k of a counter K for counting a predetermined time period is incremented by one (step 5). It is judged whether or not the count value k is not less than a reference value ko corresponding to the predetermined time period. When the count value k is less than the reference value ko, the program is returned to the step 1. When the count value k is not less than the reference value ko, the unclear state is continued for not less than the predetermined time period, so that it is judged that the double-talk state occurs. Accordingly, the third flag F3 for remembering that the speech communication state is a double-talk state is set (F3=1), and the other flags F1, F2, and F4 are reset (F1=F2=F4=0) (step 7). The program is returned to the step 1.

Specifically, when the detection of a voice by both the first voice detector 3 and the second voice detector 4 is started, the second flag F2 for remembering that the speech communication state is an unclear state is set. When a state where the voice is detected by both the detectors 3 and 4 is continued for the predetermined time period, the third flag F3 for remembering that the speech communication state is a double-talk state is set (F3=1). Thereafter, when the state where the voice is detected by both the detectors 3 and 4 is further continued, a state where the third flag F3 is set is maintained.

When no voice is detected by the first voice detector 3 at the step 1, it is judged that the second single-talk state occurs. In this case, the counter K is cleared (k=0) (step 8).

The fourth flag F4 for remembering that the speech communication state is a second single-talk state is set (F4=1), and the other flags F1, F2, and F3 are reset (F1=F2=F3=0) (step 9). The program is returned to the step 1.

When no voice is detected by the second voice detector 4 at the step 2, that is, a voice is detected by the first voice detector 3 and no voice is detected by the second voice detector 4, it is judged that the single-talk state occurs. In this case, the counter K is cleared (k=0) (step 10). The first flag F1 for remembering that the speech communication state is a first single-talk state is set (F1=1), and the other flags F2, F3, and F4 are reset (F2=F3=F4=0) (step 11). The program is returned to the step 1.

Figure 4:
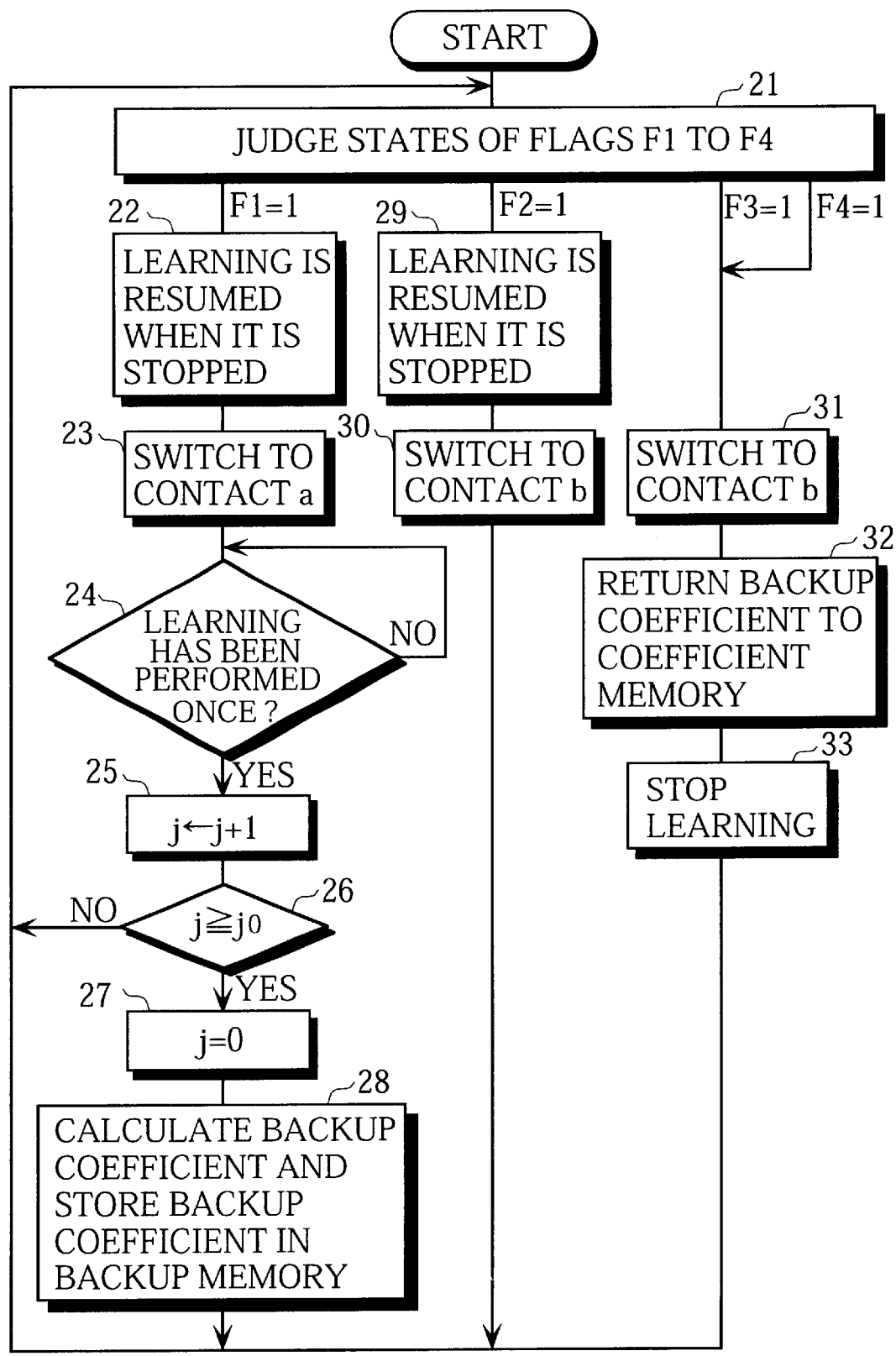
FIG. 4 is a flow chart showing the procedure for control processing of a hybrid echo canceller by a control unit.

FIG. 4 shows the procedure for control processing of the hybrid echo canceller 2 by the control unit 5.

The state of each of the flags F1 to F4 is first judged (step 21). In a case where the first flag F1 is set, that is, the first single-talk state occurs, the learning by the filter learning portion 31 is resumed when it is stopped at the following step 33 (step 22).

The switch 23 is then connected to the contact a (step 23). In this case, therefore, a signal obtained by removing from the input signal the first echo replica signal generated by the first echo canceller 21 is outputted. The first echo replica is produced using the filter coefficient stored in the coefficient memory 32.

The control unit 5 then waits until learning (learning corresponding to a predetermined time period) by the filter coefficient learning portion 31 in the first echo canceller 21 has been performed once (step 24). When the learning has been performed once, a count value j of a counter J for counting the number of times of learning is incremented by one (step 25). It is judged whether or not the count value j reaches a predetermined number of times jo (step 26). When the count value j does not reach the predetermined number of times jo, the program is returned to the step 21.

When it is judged at the step 26 that the count value j reaches the predetermined number of times jo, the counter J for counting the number of times of learning is cleared (j=0) (step 27). A backup coefficient is calculated by the foregoing equation 1, and the calculated backup coefficient is backed up in the backup memory 41 in the second echo canceller 22 (step 28). The program is returned to the step 21.

At the step 21, in a case where the second flag F2 is set, that is, the unclear state (the state where there is a possibility of a double-talk) occurs, the learning by the filter coefficient learning portion 31 is resumed when it is stopped at the following step 33 (step 29).

The switch 23 is then connected to the contact b (step 30). The program is returned to the step 21. In this case, therefore, a signal obtained by removing from the input signal the second echo replica signal generated by the second echo canceller 22 is outputted. The second echo replica is produced using the backup coefficient in the backup memory 41.

Specifically, when the unclear state occurs, there is a possibility of a double-talk. Accordingly, the filter coefficient learned by the filter coefficient learning portion 31 may be inaccurate. An echo replica is previously produced on the basis of the backup coefficient stored in the backup memory 41. When it is judged that the unclear state occurs, an echo path may be merely changed. Accordingly, the learning by the filter coefficient learning portion 31 is continuously performed.

At the step 21, in a case where the third flag F3 is set, that is, the double-talk state occurs, the switch 23 is connected to the contact b (step 31). In this case, therefore, a signal obtained by removing from the input signal the second echo replica signal generated by the second echo canceller 22 is outputted. The second echo replica is produced using the backup coefficient in the backup memory 41.

The backup coefficient backed up in the backup memory 41 is returned to the coefficient memory 32 in the first echo canceller 21 (step 32). There is a time lag from the time when the double-talk state actually occurs to the time when the double-talk state is detected. Accordingly, the contents of the coefficient memory 32 may be actually a coefficient learned in the double-talk state. Therefore, the contents of the coefficient memory 32 are returned to a backup coefficient obtained in a state occurring before the double-talk state actually occurs.

In the double-talk state, no accurate learning can be performed. The learning by the filter coefficient learning portion 31 in the first echo canceller 21 is stopped (step 33). Thereafter, the program is returned to the step 21.

At the step 21, in a case where the fourth flag F4 is set, that is, the second single-talk state occurs, learning is impossible in the hybrid echo canceller 2. Accordingly, the same processing as that in the case where the double-talk state occurs (steps 31 to 33) is performed.

When the learning by the filter coefficient learning portion 31 is stopped at the step 33, and the first single state or the unclear state then occurs, the learning is resumed at the step 22 or the step 29. In this case, the first echo replica signal is generated on the basis of the backup coefficient which has been returned to the coefficient memory 32 at the step 32. Accordingly, the learning can be converged earlier, as compared with that in a case where the filter coefficient is learned from the beginning.

As a backup coefficient, the sum of a weighting factor times a filter coefficient obtained by the newest learning and a weighting factor times the preceding backup coefficient is used. Therefore, there are advantages, described below.

In a case where the double-talk state cannot be detected, although it actually occurs, when a filter coefficient obtained by the learning is backed up as it is, a filter coefficient which is not correct may be backed up. In the present embodiment, a coefficient having a low degree of error can be backed up in such a case. The learning swings by noises. However, the swing of the learning by the noises can be absorbed by calculating the backup coefficient in the above-mentioned manner.

What is claimed is:

1. An echo canceller comprising:

means for storing in first storage means the newest filter coefficient obtained by learning means for learning a filter coefficient for producing an echo replica by an adaptive filter;

means for calculating, every time the learning is performed for a predetermined time period by the learning means, a backup filter coefficient on the basis of the newest filter coefficient obtained by the learning and storing the obtained backup filter coefficient in second storage means;

first echo cancellation means for producing an echo replica on the basis of the filter coefficient stored in the first storage means and canceling an echo on the basis of the produced echo replica;

second echo cancellation means for producing an echo replica on the basis of the filter coefficient stored in the second storage means and canceling an echo on the basis of the produced echo replica;

means for detecting a double-talk state;

means for selecting and outputting an output signal obtained by the first echo cancellation means when the double-talk state is not detected; and means for stopping the learning by the learning means, storing in the first storage means the filter coefficient stored in the second storage means, and selecting and outputting an output signal obtained by the second echo cancellation means when the double-talk state is detected, the backup filter coefficient being calculated by adding a predetermined weighting factor times the filter coefficient obtained by the learning and a predetermined weighting factor times the preceding backup filter coefficient stored in the second storage means.

2. An echo canceller comprising:

means for storing in first storage means the newest filter coefficient obtained by learning means for learning a filter coefficient for producing an echo replica by an adaptive filter;

means for calculating, every time the learning is performed for a predetermined time period by the learning means, a backup filter coefficient on the basis of the newest filter coefficient obtained by the learning and storing the obtained backup filter coefficient in second storage means;

first echo cancellation means for producing an echo replica on the basis of the filter coefficient stored in the first storage means and canceling an echo on the basis of the produced echo replica;

second echo cancellation means for producing an echo replica on the basis of the filter coefficient stored in the second storage means and canceling an echo on the basis of the produced echo replica;

means for detecting a state where there is a possibility of a double-talk;

means for detecting a double-talk state when the state where there is a possibility of a double-talk is continued for a predetermined time period;

means for selecting and outputting an output signal obtained by the first echo cancellation means when the double-talk state is not detected;

means for selecting and outputting an output signal obtained by the second echo cancellation means when the state where there is a possibility of a double-talk is detected; and means for stopping the learning by the learning means, storing in the first storage means the filter coefficient stored in the second storage means, and selecting and outputting an output signal obtained by the second echo cancellation means when the double-talk state is detected.

3. The echo canceller according to claim 2, wherein the backup filter coefficient is calculated by adding a predetermined weighting factor times the filter coefficient obtained by the learning and a predetermined weighting factor times the preceding backup filter coefficient stored in the second storage means.

4. An echo canceling method comprising the steps of:

storing in first storage means the newest filter coefficient obtained by learning means for learning a filter coefficient for producing an echo replica by an adaptive filter;

calculating, every time the learning is performed for a predetermined time period by the learning means, a backup filter coefficient on the basis of the newest filter coefficient obtained by the learning and storing the obtained backup filter coefficient in second storage means;

detecting a double-talk state;

producing an echo replica on the basis of the filter coefficient stored in the first storage means and canceling an echo on the basis of the produced echo replica when the double-talk state is not detected; and stopping the learning by the learning means, storing in the first storage means the filter coefficient stored in the second storage means, producing an echo replica on the basis of the filter coefficient stored in the second storage means, and canceling an echo on the basis of the produced echo replica when the double-talk state is detected, the backup filter coefficient being calculated by adding a predetermined weighting factor times the filter coefficient obtained by the learning and a predetermined weighting factor times the preceding backup filter coefficient stored in the second storage means.

5. An echo canceling method comprising the steps of:

storing in first storage means the newest filter coefficient obtained by learning means for learning a filter coefficient for producing an echo replica by an adaptive filter;

calculating, every time the learning is performed for a predetermined time period by the learning means, a backup filter coefficient on the basis of the newest filter coefficient obtained by the learning and storing the obtained backup filter coefficient in second storage means;

detecting a state where there is a possibility of a double-talk;

detecting a double-talk state when the state where there is a possibility of a double-talk is continued for a predetermined time period;

producing an echo replica on the basis of the filter coefficient stored in the first storage means and canceling an echo on the basis of the produced echo replica when the state where there is a possibility of a double-talk and the double-talk state are not detected;

producing an echo replica on the basis of the filter coefficient stored in the second storage means and canceling an echo on the basis of the produced echo replica when the state where there is a possibility of a double-talk is detected; and stopping the learning by the learning means, storing in the first storage means the filter coefficient stored in the second storage means, and producing an echo replica on the basis of the filter coefficient stored in the second storage means, and canceling an echo on the basis of the produced echo replica when the double-talk state is detected.

6. The echo canceling method according to claim 5, wherein the backup filter coefficient is calculated by adding a predetermined weighting factor times the filter coefficient obtained by the learning and a predetermined weighting factor times the preceding backup filter coefficient stored in the second storage means.

* * * * *